(12) United States Patent
Nakajima

(10) Patent No.: US 10,401,826 B2
(45) Date of Patent: Sep. 3, 2019

(54) NUMERICAL CONTROLLER FACILITATING MEASURE TO BE TAKEN AFTER DETECTION OF INTERFERENCE

(71) Applicant: FANUC CORPORATION, Minamitsuru-gun, Yamanashi (JP)

(72) Inventor: Masatoshi Nakajima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/466,280

(22) Filed: Mar. 22, 2017

(65) Prior Publication Data
US 2017/0277162 A1    Sep. 28, 2017

(30) Foreign Application Priority Data
Mar. 23, 2016 (JP) .................. 2016-058862

(51) Int. Cl.
G05B 13/02 (2006.01)
G05B 19/402 (2006.01)
G05B 19/409 (2006.01)

(52) U.S. Cl.
CPC ......... *G05B 19/402* (2013.01); *G05B 13/026* (2013.01); *G05B 19/409* (2013.01); *G05B 2219/24015* (2013.01); *G05B 2219/35313* (2013.01); *G05B 2219/35502* (2013.01)

(58) Field of Classification Search
None
See application file for complete search history.

(56) References Cited

U.S. PATENT DOCUMENTS

| | | | |
|---|---|---|---|
| 2005/0283270 A1 | 12/2005 | Nakamura | |
| 2006/0074514 A1 | 4/2006 | Mukai et al. | |
| 2008/0024083 A1 | 1/2008 | Yamaguchi et al. | |
| 2013/0184852 A1* | 7/2013 | Kubo ................. | G05B 19/4061 700/178 |

FOREIGN PATENT DOCUMENTS

| | | |
|---|---|---|
| JP | 2000284819 A | 10/2000 |
| JP | 2003271215 A | 9/2003 |
| JP | 2006004128 A | 1/2006 |
| JP | 2006107043 A | 4/2006 |
| JP | 2008-27376 A | 2/2008 |
| JP | 2010-244256 A | 1/2010 |
| JP | 2010140255 A | 6/2010 |
| JP | 2013125453 A | 6/2013 |

OTHER PUBLICATIONS

Notification of Reasons for Refusal for Japanese Application No. 2016-058862, dated May 1, 2018 with translation, 5 pages.
Decision to Grant a Patent for Japanese Application No. 2016-058862, dated Oct. 30, 2018, with translation, 6 pages.

* cited by examiner

*Primary Examiner* — Ryan A Jarrett
(74) *Attorney, Agent, or Firm* — RatnerPrestia

(57) ABSTRACT

A numerical controller controls driving of an axis installed in a machine based on an instruction of a program, and when predictive detection of occurrence of interference between a movable part which moves by the driving of the axis and another object is made, the numerical controller decelerates and stops movement of the movable part. Further, the numerical controller changes a display attribute of information display relating to the axis based on an operation state of the axis which is being driven when predictive detection of occurrence of interference is made, and displays a coordinate value according to the display attribute that is changed by the attribute change processing part.

4 Claims, 4 Drawing Sheets

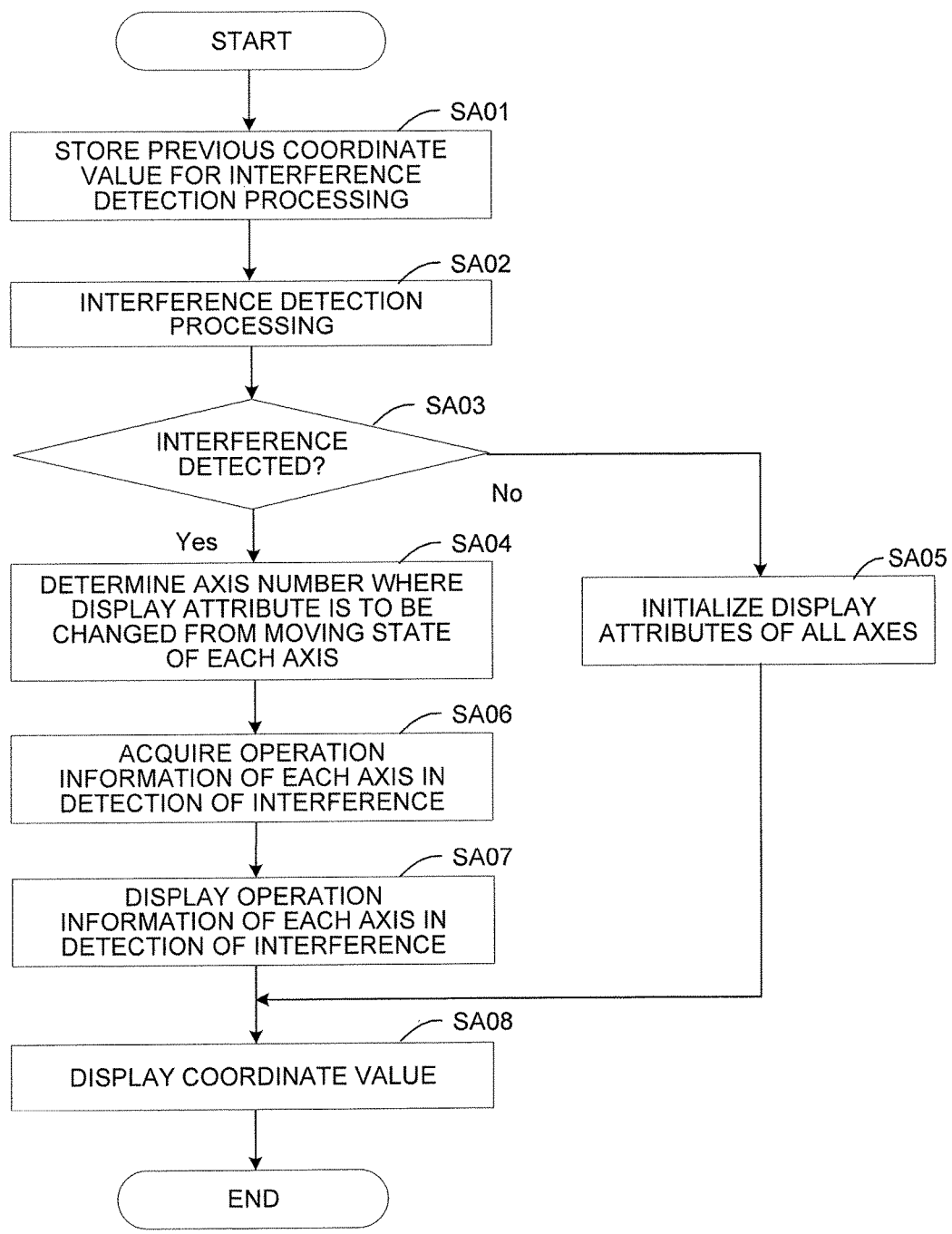

NUMERICAL CONTROLLER FACILITATING MEASURE TO BE TAKEN AFTER DETECTION OF INTERFERENCE

BACKGROUND OF THE INVENTION

1. Field of the Invention

The present invention relates to a numerical controller facilitating a measure to be taken after detection of interference.

2. Description of the Related Art

A numerical controller which controls a machine tool has a function in which occurrence of interference of a tool, a workpiece, or a predictive detection of a machine structure is made based on a preceding position against an actual machine position, as disclosed in Japanese Patent Application Laid-Open No. 2008-27376 and Japanese Patent Application Laid-Open No. 2010-244256. By using this function, the machine tool can be safely stopped before the interference is actually occurred.

However, this technique is intended to stop the machine tool safely, and the technique does not include a function which shows an axis which is moving in the predictive detection of occurrence of interference and a moving direction of the axis, or operation information of each axis in order to remove a cause of the interference after the machine tool is stopped. Accordingly, in order to know the information, it is necessary to identify the contents thereof by displaying each of the special screens. Thus, there is a desire for a function which predicts and detects necessary information to identify the cause of the occurrence of interference and notifies an operator of the information after the predictive detection of the interference is increased.

A tool position of a machine tool operated based on a NC program is displayed in an axis information display screen as a coordinate value. Ina conventional technique, after the machine tool is stopped, only the coordinate value in the predictive detection of occurrence of interference is displayed in the axis information display screen, and since the axis which is moving in the predictive detection of occurrence of interference or the moving direction of the axis are not known, a moving state of the axis in the predictive detection of occurrence of interference cannot be determined.

Further, after the predictive detection of occurrence of interference, it is necessary, at first, to move a tool to a safe place by using a manual handle or the like after switching an operation mode to a manual mode. In order to escape the tool to the safe place, it is necessary to move the axis which is moving in the predictive detection of occurrence of interference in a direction opposite to a direction in which the axis is moving in the predictive detection of occurrence of interference. However, in the conventional technique, since the moving state of the axis in the predictive detection of occurrence of interference cannot be determined, it is difficult to determine which axis should be escaped in which direction.

Further, in the predictive detection of occurrence of interference, since the machine is merely stopped and the operation information of the axis in the predictive detection of occurrence of interference is unknown, it is difficult to specify the cause of the occurrence of interference.

SUMMARY OF THE INVENTION

Accordingly, an object of the present invention is to provide a numerical controller capable of easily understanding an operation for moving a tool to a safe place after predictive detection of occurrence of interference.

The present invention solves the problem described above by installing, into a numerical controller, a function which changes a display attribute of an axis information such as a coordinate value displayed in an axis information display screen in the predictive detection of occurrence of interference based on an operation state of the axis in the predictive detection of occurrence of interference.

(1) The numerical controller according to the present invention is formed to control driving of at least one axis installed in a machine based on an instruction from a program such that when the occurrence of interference between a movable part moved by means of the driving of the axis and other object is predictively detected, the movement of the movable part is decelerated and stopped. The numerical controller is provided with an attribute change processing part which changes the display attribute of the information display relating to the axis based on the operation state of the axis which is being driven when predictive detection of occurrence of interference is made, and an axis information display processing part which performs the display of the information on the axis where the display attribute is changed by the attribute change processing part.

The numerical controller according to the present invention is configure to control driving of at least one axis installed in a machine based on an instruction of a program, and when predictive detection of occurrence of interference between a movable part moved by the driving of the axis and another object is made, decelerate and stop movement of the movable part. The numerical controller comprises: an attribute change processing part which changes a display attribute of information display relating to the axis based on an operation state of the axis which is being driven when predictive detection of occurrence of interference is made; and an axis information display processing part which displays information on the axis according to the display attribute that is changed by the attribute change processing part.

(2) The operation state of the axis may be defined by a moving direction or a moving state.

(3) The display attribute may be defined by a display color of the information, a background color of the information, addition of a letter which indicates the operation state of the axis, addition of a mark which indicates the operation state of the axis, blink display of the information, or inversion display of the information.

(4) The numerical controller may further include an operation information collection processing part which collects the operation information of the axis when predictive detection of occurrence of interference is made, and an operation information display processing part which displays the operation information collected by the operation information collection processing part.

The operation information may be defined by information relating to a velocity of the axis or a block number of the program for which predictive detection of occurrence of interference is made.

According to the present invention, the axis to be operated in order to be moved to a safe place after predictive detection of occurrence of interference between a tool, a workpiece, and machine structures and a moving direction of the axis can be easily identified, and therefore the moving operation toward the safe place after the predictive detection of occurrence of interference can be easily made. Further, various causes of the occurrence of interference may be considered, however it is considered that an error of a NC program is the primary cause.

In the present invention, the moving state and the operation information of the axis in the occurrence of interference is displayed on the same screen, and this configuration facilitates findings of an error of the coordinate value or the velocity in the program and the like, and therefore an effect on shortening of an amount of time required for correction of a program is expected.

BRIEF DESCRIPTION OF THE DRAWINGS

FIG. 4 is a schematic flowchart illustrating operation of display attribute change processing relating to the axis in the detection of occurrence of interference.

DETAILED DESCRIPTION OF THE PREFERRED EMBODIMENTS

Figure 1:
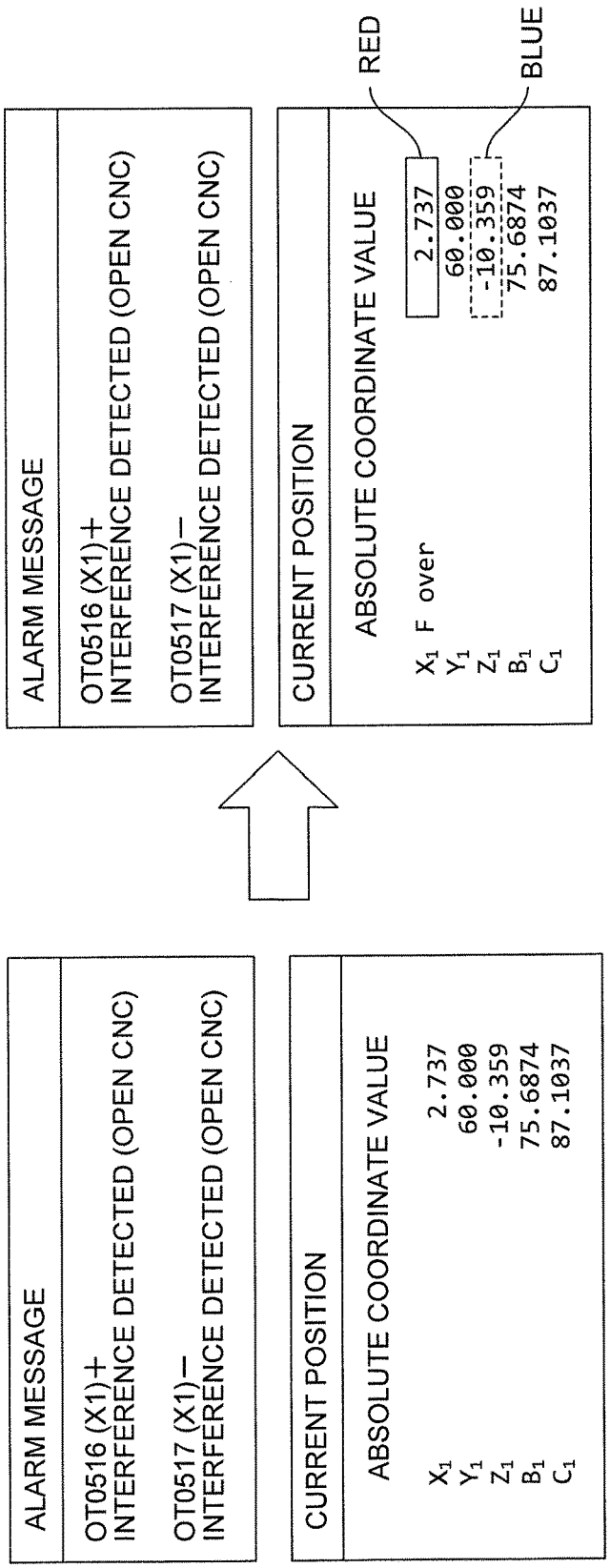
FIG. 1 is a diagram illustrating an outline of a display attribute change function of information display relating to an axis in detection of occurrence of interference, in the present invention.

When predictive detection of occurrence of interference is made as shown in FIG. 1, a numerical controller of the present invention facilitates determination of an operation state of an axis in the predictive detection of occurrence of interference by an operator by means of changing a display attribute (color of letter or the like) of information display (display of coordinate value or the like) relating to an axis on a display screen based on the operation state of the axis when predictive detection of occurrence of interference is made.

Followings are examples of the operation state of each axis as a reference for changing the display attribute of the information display relating an axis when predictive detection of occurrence of interference is made.

Operation state example 1: A moving state of the axis (during driving and stopping)

Operation state example 2: A moving direction of the axis (positive/negative direction)

Further, the operation states described above are described as examples, thus other operation state in the predictive detection of occurrence of interference may be used as the reference for changing the display attribute of the information display relating to the axis.

After predictive detection of occurrence of interference is made, the numerical controller of the present invention determines whether each axis is in motion or under suspension based on the coordinate value right before the predictive detection of occurrence of interference and the coordinate value in the detection of the interference. And, the display attribute of the information display relating to the axis which is under suspension in the predictive detection of occurrence of interference is remained (not changed), while the display attribute of the display of the axis which is moving in the predictive detection of occurrence of interference is changed.

Further, since it can be determined whether the moving direction of the moving axis is a positive direction or a negative direction based on the coordinate value right before the predictive detection of occurrence of interference and the coordinate value in the detection of the interference, the display information on an axis that moves in the positive direction and an axis that moves in the negative direction is displayed with different display attributes. The display attribute can be changed in the following way as one example.

Display attribute change example 1: The display color is changed based on the moving direction among the positive direction and the negative direction such that the positive direction is displayed by red color and the negative direction is displayed by blue color.

Display attribute change example 2: The axis information such as the coordinate value is displayed with a mark or a letter indicating the moving direction in front or rear of the axis information such that the positive direction is displayed with (+) or (↑) and the negative direction is displayed with (−) or (↓).

Display attributer change example 3: The axis information such as the coordinate value is displayed with a mark (rotation arrow) indicating a direction in which a manual handle is rotated in front or rear of the axis information by considering a direction to escape a machine tool toward the safe place (a direction opposite to the moving direction in the predictive detection of occurrence of interference).

Further, the changes of the display attribute described above are described as examples, thus the display attribute may be changed in an arbitrary way as long as the operator can determine the operation state of each axis (which axis is moved in which direction or the like) after the interference is detected, and for example, the moving axis may be displayed with blink or inversion, or an axis under suspension may be displayed with a gray background, or alternatively the size of the letter may be changed.

In the numerical controller of the present invention, the display attribute may be changed when the information relating to the axis is displayed in a display device, and further the operation information of each axis in the predictive detection of occurrence of interference may be also displayed. Followings are examples of the operation information at this time include the followings.

Operation information example 1: A velocity state of the axis (fast, slow, excessive velocity (operated at more than setting value).

Operation information example 2: A block number of a program for which predictive detection of occurrence of interference is made.

Regarding the velocity of each axis, in addition to the actual velocity, information as to whether the velocity exceeds a predetermined threshold or not is displayed.

Further, the operation information described above is described as examples, thus other operation information in the predictive detection of occurrence of interference may be displayed. Further, the information of the block of the program for which predictive detection of occurrence of interference is made can be known by using the technique disclosed in Japanese Patent Application Laid-Open No. 2008-27376 described above.

Hereinafter, a configuration of the numerical controller having the display attribute change function of the information display relating to the axis in the predictive detection of occurrence of interference described above is described.

Figure 2:
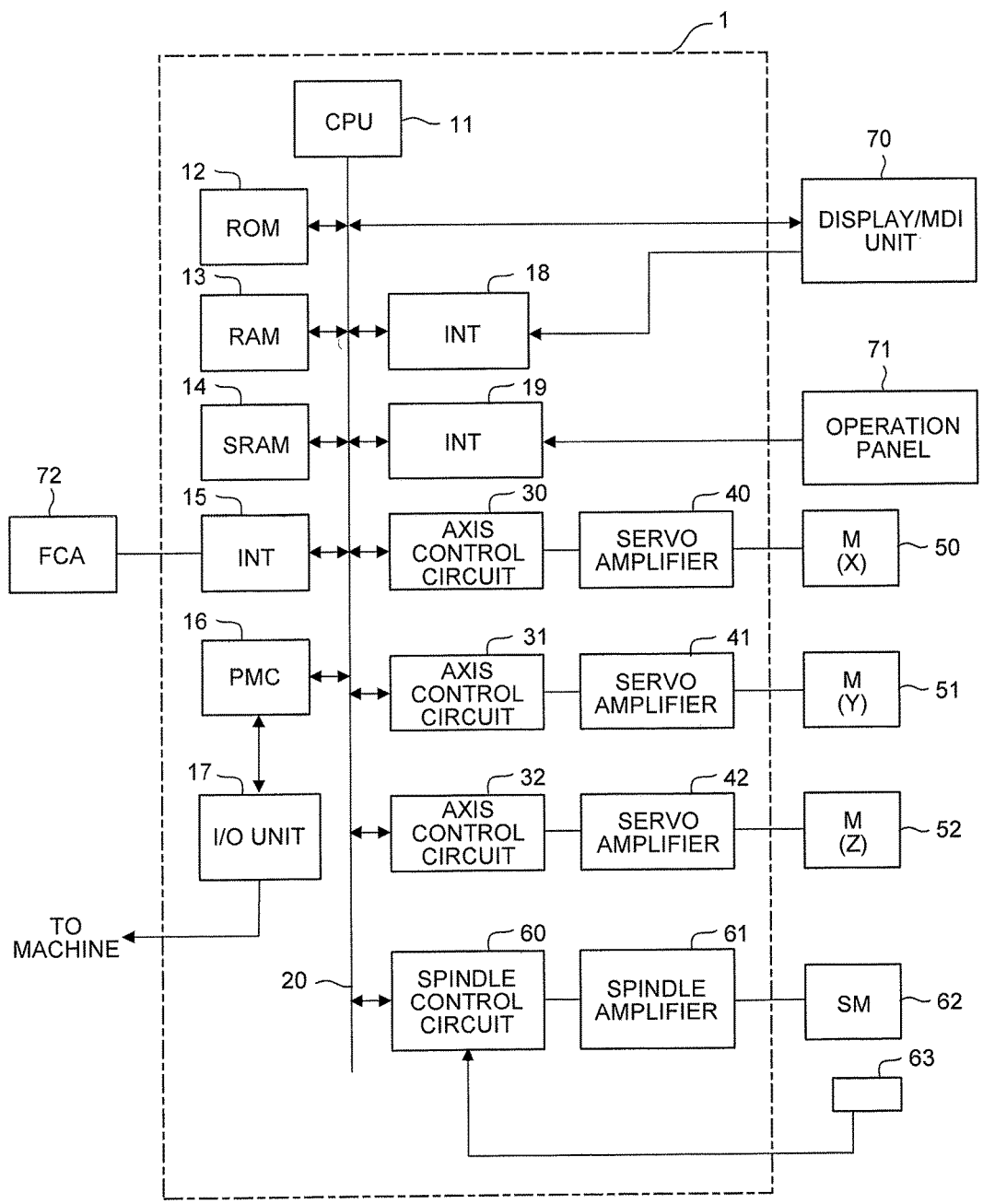
FIG. 2 is a diagram illustrating a main configuration of a numerical controller according to one embodiment of the present invention.

FIG. 2 is a hardware configuration diagram illustrating a main part of the numerical controller according to the one embodiment of the present invention.

A CPU 11 is formed as a processor which comprehensively controls a numerical controller 1, and the CPU 11 reads a system program stored in a ROM 12 via a bus 20 and controls the whole of the numerical controller 1 in accordance with the system program. A temporary calculation data, a display data, and various data input by the operator via a display/MDI unit 70 are stored in a RAM 13.

A SRAM 14 is backed up by a battery not shown and formed as a nonvolatile memory in which a storing state is held after a power source of the numerical controller 1 is turned off. A machining program, which is read via an interface 15, described below, a machining program which is input via the display/MDI unit 70 and the like are stored in the SRAM 14. Further, various system programs for executing processing of an edit mode which is required for forming or editing the machining program and the display attribute change processing of the information display relating to the axis in the predictive detection of occurrence of interference described above are written in advance in the ROM 12. The various machining programs including the machining program which operates the numerical controller according to the present invention can be input via the interface 15 or the display/MDI unit 70 and stored in the SRAM 14.

The interface 15 is formed to connect the numerical controller 1 and an external device 72 such as an adapter. The machining program, various parameters, and the like are read from a side of the external device 72. Further, the machining program edited in the numerical controller 1 can be stored in an external storage unit via the external device 72. A Programmable Machine Controller (PMC) 16 is formed as a sequence program embedded in the numerical controller 1, and the PMC 16 outputs a signal to an auxiliary device (for example, an actuator such as a robot hand for changing a tool) of the machine tool via an I/O unit 17 and controls the auxiliary device. Further, the PMC 16 receives signals of various switches of an operation panel installed in a body of the machine tool or the like and executes a necessary signal processing and then sends the signal to the CPU 11.

The display/MDI unit 70 is formed as a manual data input device provided with a display, a keyboard, and the like. The interface 18 receives an instruction and data from the keyboard of the display/MDI unit 70 and sends the instruction and the data to the CPU 11. The interface 19 is connected to an operation panel 71 provided with a manual pulse generation device and the like.

Axis control circuits 30 to 32 of respective axes receive a movement command of the respective axes from the CPU 11 and output the command of the respective axes to servo amplifiers 40 to 42 respectively. The servo amplifiers 40 to 42 receive the command and drive servo motors 50 to 52 of the respective axes. Each of the servo motors 50 to 52 of each axis includes a position/velocity detector and feedbacks a position/velocity feedback signal from the position/velocity detector to the axis control circuits 30 to 32 and executes position/velocity feedback control. Note that description regarding the position/velocity feedback is omitted in the block diagram.

A spindle control circuit 60 receives a spindle rotation instruction to the machine tool and outputs a spindle velocity signal to a spindle amplifier 61. The spindle amplifier 61 receives the spindle velocity signal and rotates a spindle motor 62 of the machine tool at an instructed rotation velocity and drives the tool.

A position coder 63 is coupled to the spindle motor 62 by a gear, a belt or the like, and the position coder 63 outputs a return pulse in synchronization with the rotation of the spindle. The return pulse is read by the CPU 11.

Figure 3:
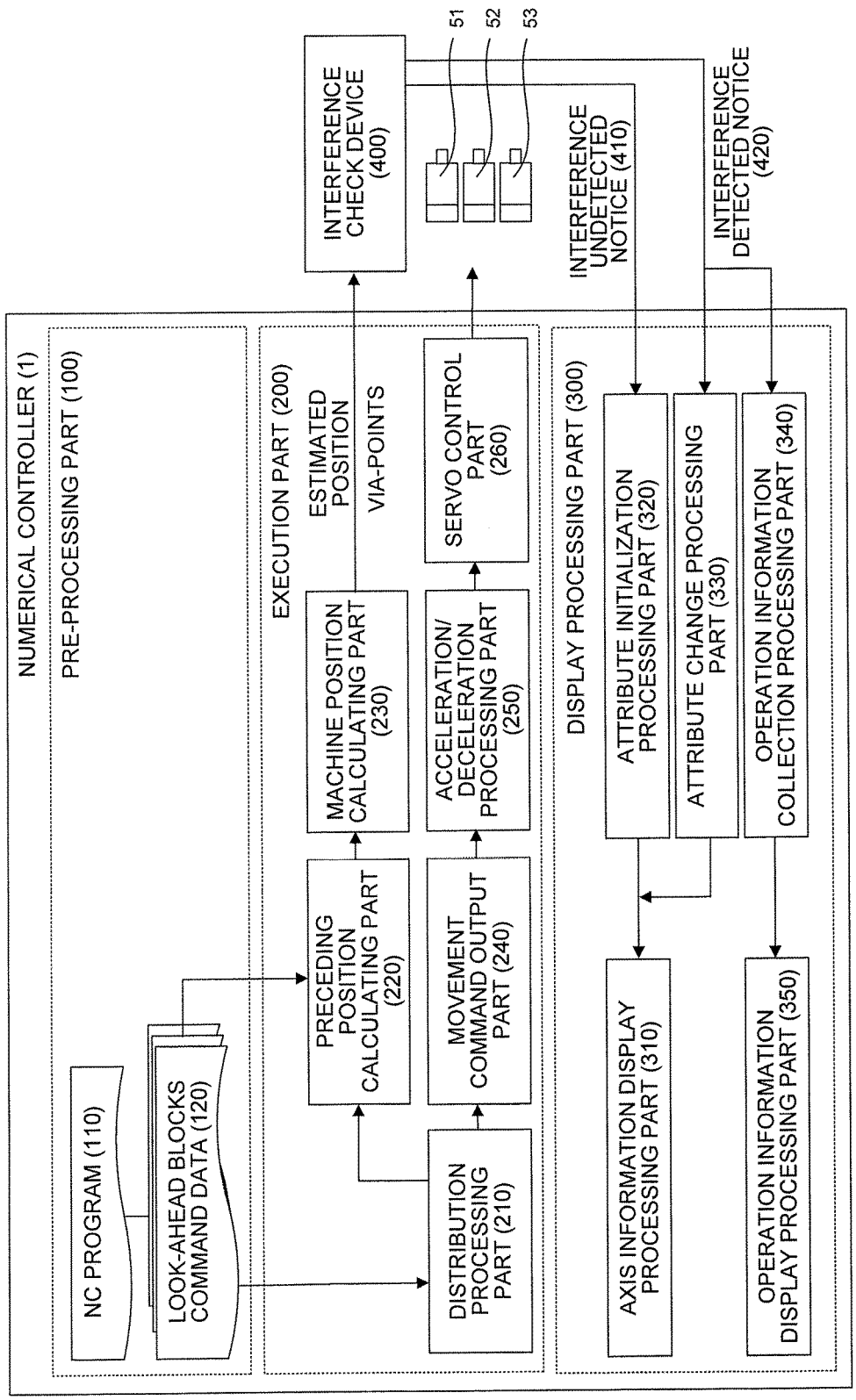
FIG. 3 is a schematic functional block diagram of the numerical controller according to the embodiment of the present invention.

FIG. 3 illustrates a schematic functional block diagram in a case in which a function which changes the display attribute of the information display relating to the axis in the predictive detection of occurrence of interference described above is installed as a system program to the numerical controller 1 shown in FIG. 2. Further, FIG. 4 is a flow chart illustrating a flow of operation when display attribute change processing of the information display relating to the axis in the predictive detection of occurrence of interference in the numerical controller 1 shown in FIG. 3 is executed.

Hereinafter, the operation of the numerical controller 1 of the present invention is described with reference to the functional block diagram shown in FIG. 3 and the flow chart shown in FIG. 4.

A pre-processing part 100 reads a NC program 110 in advance and stores as an look-ahead blocks command data 120 in a memory of the numerical controller 1.

In an execution part 200, a distribution processing part 210 acquires a distribution moving amount to be instructed to respective axes movable parts (the servo motors 50 to 52 of each axis) at each distribution frequency from an axis moving amount of each axis and a velocity of each axis instructed in each block and an override value set by a parameter or a signal, based on the look-ahead blocks command data 120 stored in the memory, and the distribution processing part 210 renews the present coordinate value by adding the acquired distribution moving amount to a current position register, which is not shown, arranged on the memory. Further, the distribution moving amount provided as a movement command is output to a movement command output part 240.

The movement command output part 240 outputs the distribution moving amount to an acceleration/deceleration processing part 250 in accordance with a state of operation of an operator or an input signal. The movement command output part 240 stops the output of the distribution moving amount, for example, when the movement command output part 240 receives a signal of an axis stop instruction.

The acceleration/deceleration processing part 250 receives the movement command output from the movement command output part 240 and executes acceleration and deceleration processing, which performs adjustment of a velocity at each distribution frequency, against the movement command, and outputs the movement command subjected to the acceleration and deceleration processing to a servo control part 260 which controls the servo motors 50 to 52.

The servo control part 260 executes feedback control of a position and a velocity based on the movement command and feedback of the position and the velocity from a position/velocity detector mounted to the servo motors 50 to 52 (or alternatively, movable parts driven by the servo motors) and executes feedback control of electric current based on feedback of the electric current from an electric current detector which detects driving current, and the servo control part 260 controls driving of the servo motors 50 to 52 via amplifiers.

Further, in the execution part 200, a preceding position calculating part 220 acquires current position data of each axis in an actual machine from information in the look-ahead blocks command data 120, each value calculated by the distribution processing part 210, or a current position of the machine stored in a current position register not shown, and the preceding position calculating part 220 calculates the position of the machine after a predetermined time lapse based on the acquired current position data and the look-ahead blocks command data 120.

A machine position calculating part 230 calculates various data such as an estimated position of the machine or via-points, which is necessary for an interference check device 400 to execute check of the interference, in accordance with operation of the movable parts of the respective axes (the servo motors 50 to 52 of the respective axes) of the machine and the machine position calculating part 230 outputs the calculated data to the interference check device 400.

The operation of each of the preceding position calculating part 220 and the machine position calculating part 230 is known by Japanese Patent Application Laid-Open No. 2010-244256 or the like, and therefore the detailed description thereof is omitted in this description.

Before the interference check device 400 executes processing of predictive detection of occurrence of interference, the execution part 200 stores the coordinate value of each axis used in the previous processing of predictive detection of occurrence of interference in the memory (Step SA01 in FIG. 4), and thereafter the interference check device 400 executes processing of predictive detection of occurrence of interference based on the information notified by the execution part 200 (Step SA02). The interference check device 400 determines whether or not predictive detection of occurrence of interference is made from a result of processing of predictive detection of occurrence of interference which is based on the estimated position and the via points (Step SA03), and in a case in which predictive detection of occurrence of interference is not made, an interference undetected notice 410 is sent to an attribute initialization processing part 320 of a display processing part 300. When the attribute initialization processing part 320 receives the interference undetected notice 410 from the interference check device 400, the attribute initialization processing part 320 initializes the display attributes of all axes (Step SA05), and the attribute initialization processing part 320 instructs an axis information display processing part 310 to display the display attribute of the coordinate value checked at this time on the screen of the display/MDI unit 70 without changing the display attribute thereof (Step SA08).

In a case in which predictive detection of occurrence of interference is made, on the other hand, the interference check device 400 sends an interference detected notice 420 to an attribute change processing part 330 and an operation information collection processing part 340 of the display processing part 300.

When the attribute change processing part 330 receives the interference detected notice 420 from the interference check device 400, the attribute change processing part 330 acquires the axis which is moving in the predictive detection of occurrence of interference and the moving direction of the axis from the coordinate value of each axis and the previous coordinate value thereof stored in Step SA01, and the attribute change processing part 330 determines an axis number in which the display attribute is to be changed (Step SA04). Further, the attribute change processing part 330 instructs the axis information display processing part 310 to change the display attribute relating to the coordinate value of the axis number for which the display attribute is determined to be changed and to display the changed display attribute on the screen of the display/MDI unit 70, and to display the display attribute relating to the coordinate value of the other axis number on the screen of the display/MDI unit 70 without changing the display attribute thereof (Step SA08).

Further, when the operation information collection processing part 340 receives the interference detected notice 420 from the interference check device 400, the operation information collection processing part 340 acquires the operation information of the respective axes such as a velocity of the respective axes in the predictive detection of occurrence of interference from the respective parts such as the distribution processing part 210 and the servo control part 260 (Step SA06), and the operation information collection processing part 340 instructs the operation information display processing part 350 to display the acquired operation information of each axis on the screen of the display/MDI unit 70 (Step SA07). In the display of the operation information in Step SA07, for example, in a case in which the velocity is displayed, the velocity may be displayed as it is, and further information as to whether the velocity exceeds a predetermined threshold or not may be displayed together with the velocity.

By arranging the numerical controller 1 having such a configuration, the axis operated to be moved to the safe place after the predictive detection of occurrence of interference between a tool, a workpiece, and machine structures and the moving direction of the axis can be easily identified, and therefore the moving operation toward the safe place after the predictive detection of occurrence of interference can be easily performed.

Further, various causes of the occurrence of interference may be considered, however it is considered that an error of a NC program is the primary cause. In the numerical controller 1 having the configuration described above, the operation state and the operation information of the axis in the predictive detection of occurrence of interference are displayed on the same screen, and this configuration facilitates findings of an error of the coordinate value or the velocity in the program, and the like, and therefore an effect on shortening of an amount of time required for correction of a program is expected.

As described above, the embodiment of the present invention are described, however the present invention is not limited only to the embodiment described above, and the present invention can be carried out by various aspects to which appropriate modification is applied.

For example, in the embodiment described above, it is described that the interference check device 400 and the numerical controller 1 are arranged as independent components, however an interference check part, which executes the predictive detection of occurrence of interference, may be installed in the numerical controller 1.

Further, in the embodiment described above, the initialization and the change of the display attribute are executed by the two functional parts of the attribute initialization processing part 320 and the attribute change processing part 330, however a configuration in which only the attribute change processing part 330 executes the initialization of the attribute and the change of the attribute may be adopted. In this case, the attribute change processing part 330 initializes the display attribute in a case in which the interference undetected notice 410 is sent from the interference check device 400, and the attribute change processing part 330 changes the display attribute in a case in which the interference detected notice 420 is sent.

The invention claimed is:

1. A numerical controller which controls driving of at least one axis installed in a machine based on an instruction of a program such that when predictive detection of occurrence of interference between a movable part moved by the driving of the axis and another object is made, the numerical controller decelerates and stops movement the movable part, the numerical controller comprising:
- an attribute change processing part which changes a display attribute of information display relating to the axis based on an operation state of the axis which is being driven when predictive detection of occurrence of interference is made; and
- an axis information display processing part which displays information on the axis according to the display attribute that is changed by the attribute change processing part,
- wherein the display attribute indicates a moving direction of the machine irrespective of the information on the axis.

2. The numerical controller according to claim 1, wherein the display attribute is defined by a display color of the information, a background color of the information, addition of a letter which indicates the operation state of the axis, addition of a mark which indicates the operation state of the axis, blink display of the information, or inversion display of the information.

3. The numerical controller according to claim 1, further comprising:
- an operation information collection processing part which collects an operation information of the axis when predictive detection of occurrence of interference is made; and
- an operation information display processing part which displays the operation information collected by the operation information collection processing part.

4. The numerical controller according to claim 3, wherein the operation information is defined by information relating to a velocity of the axis or a block number of the program for which predictive detection of occurrence of interference is made.

* * * * *